W. Frost.
Milling Tool.
N° 56,033. Patented Jul. 3, 1866.
Fig: 5.
Fig: 2.
Fig: 3.
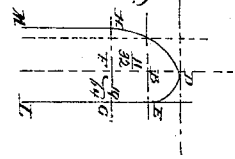
Fig: 1.
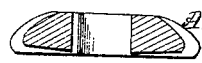
Fig: 7.
Fig: 8.
Fig 4.
Fig: 6.
Witnesses;
Inventor;
Wm Frost

UNITED STATES PATENT OFFICE.

WILLIAM FROST, OF NEWARK, NEW JERSEY.

IMPROVED TOOL FOR CUTTING TWIST-DRILLS.

Specification forming part of Letters Patent No. 56,033, dated July 3, 1866.

*To all whom it may concern:*

Be it known that I, WILLIAM FROST, of Newark, Essex county, State of New Jersey, have invented a new and useful Improvement in Tools for Cutting Twist-Drills; and I do hereby declare that the following is a full, clear, and exact description thereof, which will enable others skilled in the art to make and use the same, reference being had to the accompanying drawings, forming part of this specification, in which—

Figure 1 is an axial section of a cutting-tool made according to my invention. Fig. 2 is an elevation thereof. Fig. 3 is a diagram, showing the plan of the tool laid out. Fig. 4 is a face view, and Fig. 5 a peripherical view, of a drill made by means of my invention. Fig. 6 is a face view of a drill made by cutters commonly used. Fig. 7 is a section of a milled cutter, of the common or old style, used to make the first cut on the blank. Fig. 8 is a burr-cutter, such as is commonly used to complete the spiral groove.

Similar letters of reference indicate like parts.

The object of this invention is to produce a cutter or tool by which twist-drills may be cut or formed at one operation, and also, by the same operation, to form a straight cutting-lip upon said drill.

In the present mode of making drills of this description a groove is first made by means of a revolving wheel whose edge is semicircular and is milled so as to form a series of teeth whose greatest convexity is opposite the middle of the thickness of the wheel. The drill-blank is presented to the cutter at such an angle as to produce a spiral groove of the proper pitch when the blank is properly fed along and rotated at the same time. The spiral groove is then deepened by a milled or burr cutter with a spherical head, and sometimes with one having an ovoidal-shaped head, the teeth of each being parallel with the axis of the cutter, or nearly so.

The grooves of drills so made are of the same character throughout, both sides being hollowed out alike, and consequently as the face of a drill wears away its cutting-edges will continue to be curved. This form of the cutting-edges is very disadvantageous because their ends or points are directly broken off in working, and therefore it is desirable to make the cutting-edges straight. This has been heretofore accomplished in a subsequent operation by introducing a hand-file into the grooves from the face end of the drill and filing that side of each groove which forms the cutting-edge until it is straight. It is obvious that this can only be done for the limited distance along which the file can be brought to bear against the sides of the grooves, and when a drill is worn away below that distance the cutting-edges are found to be curved again, like the sides of the grooves.

My improvement is designed to obviate these defects in twist-drills. Fig. 1 represents a section of my device with the cutting-teeth thereon, the diagram, Fig. 3, showing the form of one of its teeth. The teeth are formed on the rim and sides of the cutter, but the diameter of the side that cuts the straight lip of the drill is greater than that of the other side. The diagram illustrates the mode of arriving at the proper form of teeth for cutters of different sizes. A point, B, is taken as a center, and a curved line is drawn from D to E, measuring a quarter of a circle, with a radius whose length is determined by the depth of the groove to be made, which will vary for drills of different diameters or sizes.

The line D B, which coincides with the line of the greatest diameter of the cutter, is extended to the point F, about eleven-thirty-seconds part of an inch, and from the point F a line is drawn at right angles to the line D F, about a distance of nineteen-sixty-fourths part of an inch, to the point G, which, in this instance, is taken to be in the line E L, which coincides with the side of the cutter having the smallest diameter. It is evident, however, that in measuring the distance F G the point G will fall beyond the line F L when that distance is greater than the radius B E, and that it will fall short of that line when it is less. From the point G as a center, with a radius G D, I then draw the curve D H, the points G F H falling in the same straight line, and the point H being the starting-point for the straight side H M of the cutter. The distances above given between the points B E and F G, respectively, may be taken for cutters of all sizes; but the radius of the curve D E varies with the depth of the groove to be cut, and is independent of the said distances. Each tooth of the cutter is made as here shown, being formed from two curves which meet at the end of the line of greatest diameter of the cutter, the corner or edge formed at the point of intersection being filed off in making the tool, so as to leave that part smooth.

In using the tool thus made it is manipulated the same as the old-style cutter, (shown in Fig. 7,) being rotated on a fixed axis, while the drill-blank is advanced against it, being rotated at the same time by means of a screw of the proper pitch, or by other convenient means.

Twist-drills made by means of the tools shown in Figs. 7 and 8, after their faces are ground down to the desired angle, have curved cutting-edges J, (see Fig. 6,) their curves being like the sides of the grooves, each cutting-edge having a corner, K, which is soon broken off, especially when the drills are used on metals, for which use they are mainly intended. In order to remedy this defect the corners K are usually filed off and the edges J J made straight, the file being worked also as far down the sides of the grooves as it can reach, which is, however, but a short distance, owing to their spiral form. It results from this that when a drill has been worn and ground away past the part filed straight the cutting-edges will again partake of the curve of the grooves.

My improvement obviates this defect by cutting the grooves so that the sides which furnish the cutting-edges will form straight cutting-edges throughout the whole extent of the twist. This I accomplish at one operation by the use of the cutter A, the grooves being thereby cut of the right shape without requiring the application of any other cutter or tool and without requiring the application of a file, as in the case of drills formed in the common mode.

Fig. 4 represents the beveled faces of a drill made by a cutting-tool like that shown in Fig. 2, the cutting-edges I I being straight and continuing straight throughout the whole length of the drill as it is worn away. Thus the cutter A not only cuts the spiral grooves, but also at the same time dresses the cutting sides of the grooves, removing corners K, and forming a straight edge throughout the whole length of each groove, making and finishing the drill in the operation of cutting its spiral grooves.

I am aware that tools have been invented for cutting and trimming the cutting portions of wood-augers; but such tools are made in a different form and do not perform the functions I claim for my device in this, namely: My cutter has two rounded sides, one of which has a greater diameter than the other. The side having the greatest diameter is constructed to cut the straight lip of the drill, and is the essential part of my device. The other side is shaped only with a view of cutting out the groove in such form as to leave sufficient stock in the drill and secure symmetry in the shape thereof. The tools referred to for making the cutting parts of augers have one concave and one convex side. Now, it is apparent that a cutter having one concave side, when that side is turned toward that portion of the groove opposite the straight lip of the drill, will leave too much stock in the drill, while said concave side, if turned toward that side of the groove designed for the straight lip, with a view of forming the same, such effort will fail, for the reason that the concave side of the cutter would necessarily round off such lip and leave it in a concave form. This results from the spiral movement of the blank while the grooving process is being carried on.

I claim—

A tool for cutting twist-drills in which that surface or portion which cuts that side of the groove terminating in the straight cutting-lip shall have a curvature and the tool be otherwise constructed substantially as described, and indicated in Fig. 3 of the drawings.

The above specification of my invention signed by me this 21st day of February, 1866.

WILLIAM FROST.

Witnesses:
M. M. LIVINGSTON,
ALEX. F. ROBERTS.